3,389,373
HEMISPHERICAL GAS FILLED SHELL FOR
ACOUSTICAL TIME DELAY ACTION
Wesley L. Angeloff and Frank R. Abbott, San Diego,
Calif., assignors to the United States of America as
represented by the Secretary of the Navy
Filed July 25, 1967, Ser. No. 656,629
7 Claims. (Cl. 340—6)

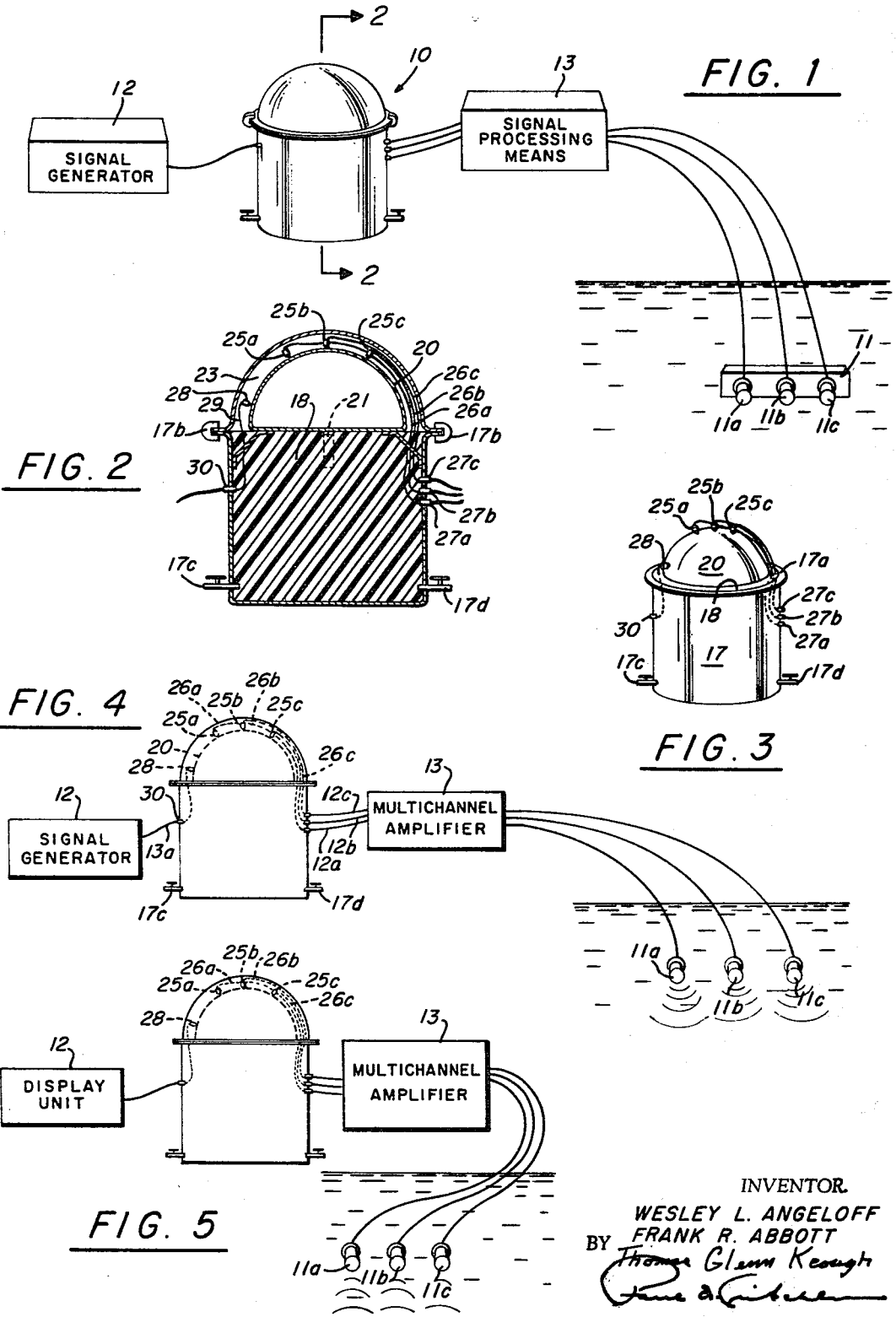

ABSTRACT OF THE DISCLOSURE

The present invention relates to an acoustic phase compensator which permits simulation of the operational characteristics of a transducer array by providing a model array simulator scalarly proportional to the acoustic transducer array and disposed in a medium having an acoustic propagation velocity which is proportional to the scalar portionality between the transducer array and the model simulator. Using appropriate driving and monitoring external circuitry, the invention permits simulation and control of the transducer array for beam forming of acoustic signals and for location of a transmitter at a distance unknown point.

---

The invention described herein may be manufactured and used by or for the Government of the United States of America for governmental purposes without the payment of any royalties thereon or therefore.

Background of the invention

Known systems and methods for simulating the operational characteristics of a transducer array or for providing a movable beam from an immovable transducer array utilize complex circuitry with a considerable number of components which introduce substantial possibility of error and malfunction. Utilizing conventional heterodyning techniques or system simulation with complicated delay line networks at best only approximates the operational characteristics of the transducer array since both of these methods inherently induce error into the transducer array by reason of the nonlinear operating characteristics of some of the components used. Present acoustic array simulators do not permit using the identical acoustic frequency within the model array simulator as the driving acoustic frequency of the transducer array or using the signal which is received from the transducer array within the simulator.

Summary of the invention

The invention is directed to providing an apparatus for simulating operational characteristics of an acoustic transducer array and includes a pair of hemispherically shaped shells forming a chamber therebetween, a plurality of fixed model transducers disposed within a chamber and positioned in a scalar relationship to said array. A movable model transducer also is disposed within the chamber and freely positionable to maintain a selective scalar relationship to the said fixed model transducers. A gas within the chamber has a density permitting a selective variation of the velocity of acoustic energy propagation between the fixed and model transducers. A means of receiving an input signal representative of acoustic energy is operatively connected to the fixed model transducers and to the transducer array and a means for producing an output representative of acoustic energy is operatively connected to the fixed model transducers and the movable model transducers. Being thusly arranged the simulator exhibits the characteristics of an acoustic receiving or transmitting lens. In one form, the means for producing an output signal is an oscilloscope or recorder which permits visual observation of the input signal to determine the location of a distant transmitter simulator. In another form, the means for receiving an input signal is a signal generator for permitting beam forming at a distant point, such point being scalarly positioned on the simulator by the movable model transducer acting as a transducer projector.

It is a primary object of the present invention to provide an apparatus for simulating the operational characteristics of an acoustic transducer array.

Another object of the present invention is to provide a transducer array simulator utilizing a transmitting medium having a slower velocity of acoustic propagation therethrough.

Still another object of the invention is to provide a simulator using the identical acoustic frequency which is used to drive a transducer array.

A further invention is to provide a means permitting movable acoustic energy beam forming at distant points using an immovable transducer array.

Another object of the invention is to provide a device for determining the location of a distant source of acoustic signals.

Yet another object is to provide a simulator that functionally operates as an acoustic lens.

These and other objects of this invention will become apparent to those skilled in the art upon consideration of the accompanying specification, claims, and drawings.

Brief description of the drawings

FIG. 1 shows the simulator coupled to a transducer array in an actual operational environment.

FIG. 2 is a sectional view of the simulator taken along lines 2—2 in FIG. 1.

FIG. 3 is a perspective view of the simulator having the outer shell removed.

FIG. 4 depicts the invention used to control an array of projection transducers to form beamed acoustic energy to distant points.

FIG. 5 shows invention used with a receiving transducer array for determining position location of a distant source.

The time taken for a compressional transmission of an acoustic signal through a medium is not a function of frequency but is dependent primarily upon the distance travel and the velocity of propagation through the medium. By controlling a medium as to temperature and pressure the velocity of propagation can be held constant throughout.

Simply stated, the relationship can be shown as:

$$d = rt$$

where $d$ is the physical distance between an acoustic projector and a receiver, $r$ is the velocity of acoustic energy propagation through a medium, and $t$ is the time required for the acoustic signal, having a predetermined magnitude and phase, to travel $d$.

Giving $t$ a constant value $k$ the relationship becomes:

$$d = rk$$

from which it is seen that the distance travelled by the acoustic signal is directly proportional to the velocity of acoustic energy propagation.

If $k = \frac{1}{100}$ second, a transducer array projecting through a water medium, where $r$ approximately equals 5,000 feet per second, will transfer an acoustic signal of a given phase a distance of 50 feet. On the other hand, if the identical acoustic signal of identical phase were projected through another medium which has a much slower rate of propagation, e.g., Freon 14 having a velocity of acoustic energy propagation of approximately 500 feet per second, the distance travelled by the acoustic signal during the same time period $k$ would be 5 feet. Therefore, projecting an identical acoustic signal through a "slower" medium enables a scale simulation of an acoustic signal having been projected over a $d$ of 50 feet within a scale model $d$ of five feet.

Accordingly, a model simulator using three fixed model projection transducers, each transmitting at a particular phase and frequency, could be co-linearly separated a $d$ of one foot in the Freon 14 medium to simulate a line projector transducer array transmitting at identical phases and frequencies being spaced ten feet apart. The composite signal monitored by a movable model transducer at a $d$ of five feet from the fixed model transducers would be identical to the composite signal monitored fifty feet from the line array. By transmitting and receiving particular frequencies in the model simulator the array can be directly controlled to permit beam forming or signal tracking using the identical frequencies. The elimination of the need for heterodyning between the model simulator distinguishes the invention as a substantial improvement over the "Hemispherical Acoustic Phase Compensator" U.S. Patent No. 2,898,589, issued Aug. 4, 1959 to one of the present co-inventors.

When used for beam forming of an in-phase plane wave front along a desired azimuth, a movable model projector-transducer is positioned in the gas filled chamber so that the direction of signal projection from the movable model transducer to a plurality of fixed model receiver-transducers, positioned in accordance to a projecting array disposed in water, is the same as the desired azimuth. The projected signal reaches individual ones of the fixed model transducers at different times producing different phases of the projected signal. These different phases are passed from the fixed model receiver-transducers to actuate respectively connected transducers in the array for focusing the phased signals along the desired azimuth in an in-phase plane wave front.

Similarly, the model simulator can be used to determine the azimuth of a distant acoustic signal. Thusly used the array, as receiver transducers, pass different phases of the received distant signal to fixed model projector-transducers which project the different phases to a movable model receiver-transducer connected to an external sensing device or oscilloscope. By moving the movable model transducer around the hemispherical axis of the simulator, different phase relationships of the received distant signal can be observed. When a focused inphase plane wave front signal is indicated, the azimuth of the distant signal is known by observing the relationship of the movable model transducer to the fixed model transducers.

The focusing of transmitted or received signals gives the simulator the characteristics of an acoustic lens that focuses acoustic energy in much the same manner as an optical lens focuses light.

Referring to FIG. 1, an acoustic simulator 10 is associated in an operative relationship with a transducer array 11 disposed in a transmitting medium such as water. A signal generator 12 and a signal processing means 13 are interconnected to the simulator and the array in different manners and with different purposes according to whether or not the array is intended to act as a receiver of acoustic energy or as a projector of acoustic energy, and more particularly, as a projector of beamed acoustic energy. Here, the array is shown for simplicity as a line array including the receiver-projector transducers 11a, 11b, and 11c linked by conductors of equal length to means 13.

The simulator includes a cylindrically shaped sump 17 that is filled with a sound absorber such as fiberglass 18. A first hollow hemispherically-shaped shell 20 is rigidly affixed to the sump 17 by several braces 21. The sump is additionally provided with a circumferential flange 17a which carries several releasable latches 17b. The second hollow hemispherically-shaped shell 22 being of a slightly larger diameter than the first shell is formed to rest on the circumferential flange and be secured thereto by the releasable latches to form a hollow hemispherically shaped chamber 23 between the first and second shells. The braces do not isolate the fiberglass filled sump from the chamber but merely support the first shell on the sump. A pair of valves 17c and 17d permit an ingress and egress of gas from a source (not shown) to the sump. Since the braces do not isolate the chamber from the sump, the gas is free to pass to and circulate through the chamber. The sound absorber, first shell, and second shell are all constructed of material having a high absorption coefficient to prevent or minimize reflection of acoustic signals within the simulator.

Mounted in the chamber in a substantially acoustically isolated relationship from the first and second shell a plurality of fixed model transducers 25a, 25b, and 25c are disposed. The model transducers are arranged so that the physical spacing from one another is scalarly identical to the physical separation of the transducer array. Thus, the elements of our example line transducer array spaced ten feet from one another would be scalarly spaced by the fixed model transducers by being separated a distance of one foot.

A plurality of fixed model conductors 26a, 26b, 26c of equal length extend from individual ones of the fixed model transducers and terminate in three separate external terminals 27a, 27b, and 27c. A movable model transducer 28 is similarly disposed in the chamber between the inner and outer shells and is provided with a lead 29 extending to an external post 30. The fixed model transducers and the movable model transducer are adapted to be supported on the inner shell in an acoustically isolated relationship.

To control and operate the transducer array as a beam forming array which projects a composite acoustic signal having an in-phase plane wave front at a desired azimuth, the transducer array and model simulator are connected as shown in FIG. 4. The signal generator 12 generates an acoustic signal and passes it through generator lead 13a through the external post 30, and to movable model projector-transducer 28 which is positioned to transmit the signal to the fixed model receiver-along a desired azimuth. Various elements of the fixed model transducers receive the signal projected through the gas medium at different times and produce electrical output signals representative of the identical acoustic signal but of different phases. These differently phased output signals are passed to separate channels in multichannel amplifier 13 via conductors 26a, 26b, and 26c and leads 12a, 12b, and 12c. The signals are amplified, conducted to transducers in the array that correspond to the fixed model transducers, and acoustic signals in an in phase wave front are transmitted along he desired azimuth to a distant point.

Turning now to FIG. 5, the location of a single transmitter distant the transducer array is established when the transducer array is an array of receiver-transducers each receiving an acoustic signal from the distant source. The array converts the acoustic signals to representative electrical signals of different phases and passes the representative signals to the signal processing means, a multichannel amplifier 13. The representative signals are amplified and delivered to fixed model projection transducers 25a, 25b, and 25c. Signals of different phases but the same frequency as the acoustic signal are projected from different fixed model transducers through the gas and are received by a movable model receiver-transducer 28. The movable transducer is freely positionable on the equatorial circumference of the simulator and is secured thereon by adhesive or other well known means. A sensor or oscilloscope 12 is connected to transducer 28 to give an indication of phase and magnitude of the signals of different phases. By positioning transducer 28 so that the sensor indicates a composite in-phase plane wave front signal the direction of acoustic signal origination is determined by noting the relationship of transducers 25a, 25b, and 25c to transducer 28.

In the preceding examples the gas, Freon 14, was used in the chamber. Other gasses having different velocities of propagation of acoustic energy therethrough would enable further miniaturization or enlargement of the model simulator without departing from the scope of the invention. Also, the line array disclosed above was only used as an example; the positioning of the fixed model transducers in accordance with the transducer array could as a matter of choice be as a triangular array of a round array or other well known transducer array forms.

Obviously many modifications and variations of the present invention are possible in the light of the above disclosure and therefore within the scope of the appended claims the invention may be constructed and practiced in manners different than specifically set forth above.

What is claimed is:

1. An apparatus for simulating the operational characteristics of an acoustic transducer array comprising:
   a means for enclosing a chamber;
   a plurality of fixed model transducers disposed within said chamber and spaced one from another in a scale relationship to said array;
   movable model transducer disposed within said chamber and positionable in a selective scalar relationship to said fixed model transducers, said movable and fixed model transducers adapted to transfer acoustic signals therebetween;
   means for introducing a gas within said chamber for selectively varying the velocity of propagation of said acoustic signals therethrough;
   means for receiving an input signal representative of acoustic energy and being operatively connected to said fixed model transducers and said array; and
   means for producing an output signal representative of acoustic energy and being operatively connected to said fixed model transducers and said movable model transducer, said output signal and said input signal representing identical frequencies to permit phase correlation.

2. An apparatus according to claim 1 wherein the chamber enclosing means includes:
   a first hemispherically shaped shell;
   a second hemispherically shaped shell having a greater radius than the first shell and being concentrically disposed therewith to form said chamber as a hollow-hemispherical chamber for transferring said acoustic signals as an acoustic lens; and
   a chamber sump communicating with said hollow-hemispherical chamber fixedly mounting the first shell and releasedly mounting the second shell.

3. An apparatus according to claim 2 further including:
   valve means mounted on said sump permitting a selective transfer of said gas from said sump, said first shell and said second shell constructed of a material having a relatively high absorption coefficient.

4. An apparatus according to claim 3 further including:
   a sound absorbing composition disposed in said sump for minimizing reflection of said acoustic signals.

5. An apparatus according to claim 4 wherein said array is disposed in water and said gas has an acoustic velocity of propagation that provides a ratio of acoustic velocity of propagation of said gas to said water that is proportional to the scale relationship spacing of said fixed model transducers to said array for permitting the simultaneous transfer of identical acoustic frequencies in the apparatus and said array.

6. An apparatus according to claim 5 in which said array is a plurality of projectors and said apparatus provides phased signals to control acoustic beam forming from said array in a given direction by providing said movable model transducer as a projector directionally positioned in accordance with said given direction, said fixed model transducers as receivers, said means for producing an output signal as a signal generator passing an acoustic signal to said movable model transducer, and said means for receiving an input signal is a multichannel amplifier, said acoustic signal being received by said fixed model transducers forming said acoustic signal as said phased signals used to drive said array to permit beam forming of said acoustic signal in a direction identical to the disposition of said movable model transducer to said fixed model transducer whereby said apparatus functions as an acoustic lens.

7. An apparatus according to claim 5 in which said array is a plurality of receivers passing more than one phase of a distant transmitted signal and producing representative electrical signals, and said apparatus produces a composite signal having phases identical to the distant signal by providing said means for producing an output signal as an oscilloscope producing a visual representation of said composite signal, said movable model transducer as a receiver connected to said oscilloscope for producing an electric signal representative of said composite signal, said fixed model transducers as projectors being scalarly disposed from and projecting said composite signal to said movable model transducer, and said means for producing an output signal as a multichannel amplifier, said representative electrical signals converted to said composite signals by said fixed model transducers and whereby upon positioning said movable model transducer and said visual representation indicates an in-phase plane wave front the direction from the array to a distant transmitter is identical of the disposition of the movable model transducer to the fixed model transducers.

References Cited

UNITED STATES PATENTS

| | | | |
|---|---|---|---|
| 2,898,589 | 8/1959 | Abbott | 340—6 X |
| 3,239,799 | 3/1966 | Boucheron | 340—6 |

RICHARD A. FARLEY, *Primary Examiner.*